__3,644,288__
__METHOD OF PREPARING RETICULATED POLYBENZOXAZOLES__
Jean Odier, Antony, France, and Joerg Sambeth, Carouge, Geneva, and Friedrich Grundschober, Confignon, Geneva, Switzerland, assignors to Societe Anonyme Francaise du Ferodo, Paris, France
Filed June 5, 1968, Ser. No. 784,961
Claims priority, application France, June 5, 1967, 109,041
(Filed under Rule 47(a) and 35 U.S.C. 116)
Int. Cl. C08g 33/02
U.S. Cl. 260—47 CP                              6 Claims

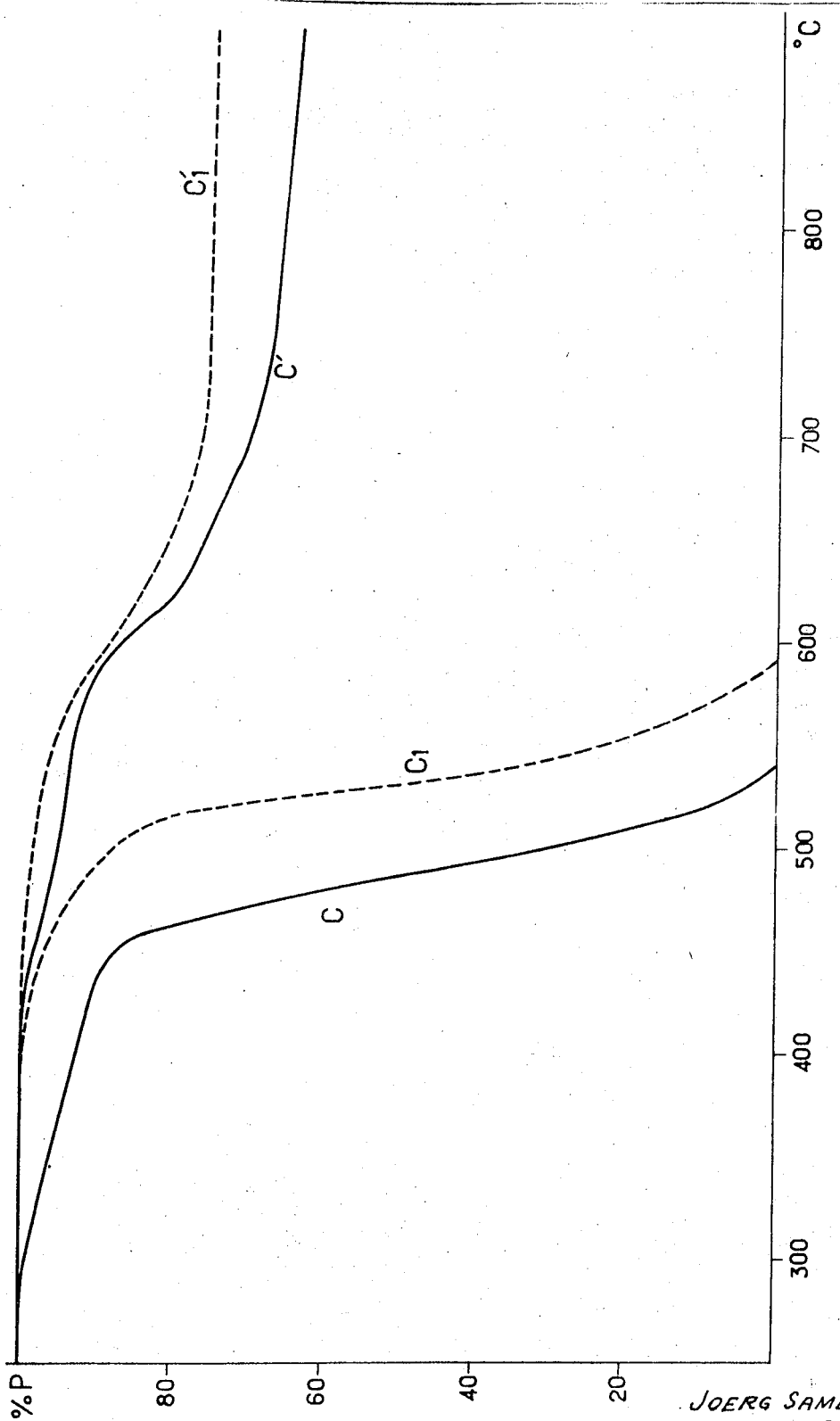

ABSTRACT OF THE DISCLOSURE

Reticulated polybenzoxazoles and a method of their manufacture, comprising divalent radicals $R_1$ and trivalent radicals $R_2$ which may be aliphatic or aromatic radicals, substituted or not, or a plurality of aromatic radicals bound to each other either directly or by at least one of the radicals selected from the group comprising the radicals: alkyl, dioxy-alkyl, cyclanilidenes, —S—, —$SO_2$—, —O—, —CO—, said divalent radicals and trivalent radicals being bound together by the structure:

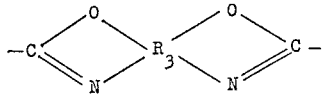

in which $R_3$ represents a tetravalent radical which may be an aromatic radical, substituted or not, or a plurality of said radicals coupled together directly or by at least one of the radicals selected from the group comprising the radicals: alkyl, dioxy-alkyl, cyclanilidenes, —S—, —$SO_2$—, —O—, —CO—, the ratio of the trivalent radicals to the divalent radicals being comprised between 1:20 and 1:1, and preferably between 1:20 and 1:5.

---

The present invention has for its object to provide new condensation products and articles and a method for their preparation. More particularly, the invention relates to reticulated polybenzoxazoles and their manufacture.

As regards the polymers which comprise benzoxazole nuclei in their main chains, there are at present only known the linear polybenzoxazoles. While these polymers are non-meltable, thermo-stable and insoluble in organic solvents, they do not entirely correspond to the requirements of certain applications.

One object of the present invention is to provide reticulated polybenzoxazoles and more particularly aromatic polybenzoxazoles which have properties superior to those of linear polybenzoxazoles, in particular very good stability under heat and more particularly in an oxidizing atmosphere, total insolubility in all solvents and high resistance to attack by chemical products.

Another object of the present invention is to provide fashioned objects and coatings formed by reticulated polybenzoxazoles which lend themselves to all applications at high temperature, and more particularly as electrical insulators and as a binder in composite objects of all kinds.

Another object of the present invention is to provide a method of manufacture of reticulated polybenzoxazoles from reticulated hydroxyl polyamides.

The reticulated polybenzoxazoles according to the invention comprise divalent radicals $R_1$ and trivalent radicals $R_2$ which may be aliphatic or aromatic radicals, substituted or not, or a number of aromatic radicals bound to each other either directly or by at least one of the radicals selected from the group comprising the alkyl, dioxy-alkyl radicals, cyclanilidenes, —S—, —$SO_2$—, —O—, —CO—, the said divalent radicals and the said trivalent radicals being bound together by:

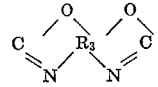

in which $R_3$ represents a tetravalent radical which can be an aromatic radical, substituted or not, or several of these radicals bound together directly or by at least one of the radicals selected from the group comprising the alkyl, dioxy-alkyl, cycloanilidenes, —S—, —$SO_2$—, —O—, —CO—, radicals, the ratio of the trivalent radicals to the divalent radicals being comprised between 1:20 and 1:1, preferably between 1:20 and 1:5.

The method of manufacture of reticulated polybenzoxazoles according to the invention consists of heating gradually to a temperature comprised between 220 and 400° C., for the time necessary to obtain complete cyclization, at least one reticulated hydroxyl polyamide comprising aliphatic and/or aromatic radicals $R_1$ and $R_2$ bound together by:

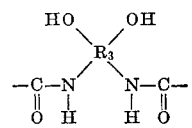

$R_1$, $R_2$ and $R_3$ having the same meaning as above, each OH group being fixed directly on an atom of carbon of the radical $R_3$ in the ortho or para position with respect to the carbon atom on which is fixed the amide group:

These reticulated hydroxyl polyamides are obtained by the method described in detail in copending application Ser. No. 784,959, filed under even date herewith which consists in reacting together a dihydroxyl diamine, a compound of dicarboxylic acid and a compound of tricarboxylic acid. This reaction may be carried out either by poly-condensation in fusion when the acid compounds are esters, or by polycondensation in solution or by interfacial poly-condensation when the acid compounds are halogenides.

In greater detail, the reticulated polyamide of the above-identified copending application comprises divalent radicals $R_1$ and trivalent radicals $R_2$ which may be aliphatic or aromatic radicals, substituted or not, or a number of aromatic radicals bound to each other either directly or by at least one of the radicals selected from the group comprising the alkyl, dioxy-alkyl, cyclanilidines, —S—, —$SO_2$—, —O—, —CO— radicals, the said divalent radicals and the said trivalent radicals being coupled to each other by the structure:

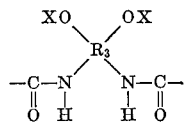

in which $R_3$ represents a tetravalent radical which may be an aromatic radical, substituted or not, or a number of aromatic radicals coupled together directly or by at least one of the radicals selected from the group comprising the alkyl, dioxyalkyl, cyclanilidenes, —S—, —$SO_2$—, —O—, —CO— radicals; X representing hydrogen or at least one of the three radicals: $R_4$,

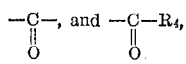

in which $R_4$ represents an alkyl or aryl radical, and in which each OX group is fixed directly on a carbon atom of the tetravalent radical in the ortho or para position with respect to the carbon atom on which is fixed the amide group —NHCO—, the ratio of the trivalent radicals to the divalent radicals being comprised between 1:20 and 1:1, and preferably between 1:20 and 1:5.

The method of preparation of reticulated hydroxyl or alkoxyl polyamide consists in causing the reaction of:
(a) at least one compound of diamine having the formula:

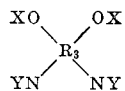

in which $R_3$ and X have the same meaning as above, Y representing two hydrogens or, when X is not hydrogen, the radical =C=O, and in which each NY group is fixed directly on a carbon atom of the radical $R_3$ in the ortho or para position with respect to the carbon atom on which the group OX is fixed;
(b) At least one compound of dicarboxylic acid selected from the compounds corresponding to the formula:

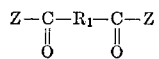

in which $R_1$ has the same meaning as above, Z representing a halogen or a group —O—$R_5$ in which $R_5$ is a monovalent radical chosen from the aromatic hydrocarbon radicals when Y represents two hydrogen, and a hydroxyl when Y represents the radical =C=O, and
(c) at least one compound of tricarboxylic acid selected from the compounds complying with the formula:

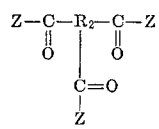

in which Z and $R_2$ have the same meaning as above, the ratio of the tricarboxylic acid compound to the dicarboxylic acid compound being composed between 1:20 and 1:1, and preferably between 1:20 and 1:5, the number of

groups being identically the same as that of the groups —N=Y.

With regard to the diamine compound, there may be employed the hydroxyl or alkoxyl diamines or alternatively the derivatives of these latter.

As hydroxyl diamines, there will preferably be utilized the following diamines:

3,3'-dihydroxy-benzidine;
bis(3-amino-4-hydroxy)-biphenyl;
1,2-bis(3-hydroxy-4-amino-phenyl)ethane;
2,2 bis(3-hydroxy-4-amino-phenyl) propane;
bis (trifluoro-methyl) methane;
bis (3-hydroxy-4-amino-phenyl) ether;
bis (3-hydroxy-4-amino-phenyl) sulphide;
bis (3-hydroxy-4-amino-phenyl) sulphone;
bis (3-hydroxy-4-amino-phenyl) ketone;
bis (3-hydroxy-4-amino-phenyl) methane;
(3-hydroxy-4-amino-phenyl)-3-hydroxy-4-amino;
bis (3-amino-4-hydroxy-phenyl) ether;
bis (3-amino-4-hydroxy-phenyl) sulphide;
bis (3-amino-4-hydroxy-phenyl) sulphone;
bis (3-amino-4-hydroxy-phenyl) ketone;
bis (3-amino-4-hydroxy-phenyl) methane;
1,2-bis (3-amino-4-hydroxy-phenyl) ethane;
2,2-bis (3-amino-4-hydroxy-phenyl) propane;
1,5-diamino-2,6-naphthalene diol;
1,6-diamino-2,5-naphthalene diol;
2,5-diamino-1,6-naphthalene diol;
2,6-diamino-1,5-naphthalene diol;
1,6-diamino-2,7-dihydroxy-naphthalene;
2,5-diamino-1,7-dihydroxy naphthalene;
1,7-diamino-2,6-dihydroxy naphthalene;
2,7-diamino-1,6-dihydroxy naphthalene;
2,7-diamino-3,6-dihydroxy naphthalene;
3,7-diamino-2,6-dihydroxy naphthalene;
1,5-diamino-4,8-dihydroxy naphthalene;
1,5-diamino-2,6-dihydroxy anthracene;
1,8-diamino-2,7-dihydroxy phenanthrene;
1,4-diamino-2,5-dihydroxy benzene;
1,3-diamino-4,6-dihydroxy benzene.

As alkoxyl diamines, there will preferably be employed the methoxyl diamines corresponding to the hydroxyl diamines recited above. With regard to the derivatives of alkoxyl diamines, there will preferably be utilized the diisocyanates of methoxyl diamines.

The choice of the compounds of dicarboxylic and tricarboxylic acids will be made according to the nature of the diamine compound utilized.

When the compound of hydroxyl or alkoxyl diamine is the diamine itself, the acid compounds are derivatives of the dicarboxylic and tricarboxylic acids, such as the dihalogenides and trihalogenides or the diesters and triesters of the said acids.

When the diamine compound is a di-isocyanate derivative of the corresponding alkoxyl diamine, the acid compounds are the acids themselves.

With regard to the compounds of dicarboxylic acid, the following acids or their derivatives will be employed: malonic acid; succinic acid; glutaric acid; adipic acid; pimelic acid; suberic acid; azelaic acid; sebacic acid; nonane-dicarboxylic acid and higher acid homologues; isophthalic acid; terephthalic acid;

biphenyl-3,3'-dicarboxylic acid;
biphenyl-4,4'-dicarboxylic acid;
bis(3-carboxy-phenyl) methane;
bis(4-carboxy-phenyl) methane;
2,2-bis(3-carboxy-phenyl) propane;
2,2-bis(4-carboxy-phenyl) propane;
2,6-dicarboxylic naphthalene;
bis(3-carboxy-phenyl) ether;
bis(4-carboxy-phenyl) ether;
bis(3-carboxy-phenyl) sulphide;
bis(4-carboxy-phenyl) sulphide;
bis(3-carboxy-phenyl) sulphone; and
bis(4-carboxy-phenyl) sulphone.

As derivatives of dicarboxylic acids, there can be employed the dihalogenides or the arylic diesters, more particularly the phenolic and naphtholic diesters.

With regard to the compounds of tricarboxylic acids, there will be employed the following acids or their derivatives: benzene-1,3,5-tricarboxylic acid (known commercially as trimesic acid);

benzene-1,2,3-tricarboxylic acid;
benzene-1,2,5-tricarboxylic acid;
biphenyl-2,4,4'-tricarboxylic acid;
biphenyl-2,3,4'-tricarboxylic acid;
biphenyl-2,4,3'-tricarboxylic acid;
biphenyl-3,4,4'-tricarboxyl sulphone;
anthracene-1,2,4-tricarboxylic acid;
naphthalene-1,2,7-tricarboxylic acid;
naphthalene-1,2,4-tricarboxylic acid;
naphthalene-1,4,5-tricarboxylic acid;
triphenyl-methane-2,2',2''-tricarboxylic acid;
bis(2-carboxy-phenyl) acetic acid.

As derivatives of tricarboxylic acids, there may be employed the trihalogenides or the arylic triesters, more particularly the phenolic and naphtholic triesters.

One manner of carrying into effect the method according to the aforesaid application consists of polycondensing, in the molten state, the diamine, the compound of dicarboxylic acid and the compound of tricarboxylic acid.

As compounds of carboxylic acid, there are chosen compounds from amongst the meltable compounds, and therefore the esters, and more particularly the phenolic and naphtholic esters of the dicarboxylic and tricarboxylic acids mentioned above.

A mixture of the starting substances is heated under agitation to a temperature and for the time necessary for the completion of the reaction.

The temperature must be above the melting point of the esters, but must not exceed 220° C. in order to prevent cyclization which might take place in certain cases.

The temperature will therefore be comprised between the melting point of the esters employed and 220° C. preferably between 200° and 220° C.

The period of the reaction depends on the degree of condensation desired. It it is desired to obtain a polymer having a large number of reactive terminal groups, the duration of the reaction will be regulated in such manner as to obtain a low degree of condensation.

The product obtained is produced in the form of a solid mass which can be reduced to powder and which lends itself to moulding.

The reaction may also be carried out directly in a mould at the temperatures indicated above, under pressures which may reach 1500 kg./sq. cm.

It is also possible to proceed in the presence of a filler substance.

When the diamine compound employed is a methoxyl di-isocyanate, the dicarboxylic acids and the tricarboxylic acids themselves will be employed as the carboxylic compounds.

In this case, the di-isocyanate, the dicarboxylic acid and the tricarboxylic acid are intimately mixed, and the mixture is heated to a temperature comprised between 150° and 250° C., preferably between 200° and 220° C., for a duration sufficient for the completion of the reaction. The poly-condensation is effected with liberation of carbon dioxide.

The reticulated polyamides may also be obtained by other methods of poly-condensation which are in general use, such as poly-condensation in solution and interfacial poly-condensation.

In the case of poly-condensation in solution, there are employed as acid compounds the di-halogenides and tri-halogenides of dicarboxylic and tricarboxylic acids, preferably the chlorides.

The starting products are caused to react in the midst of an organic solvent and in the presence of pyridine as an acceptor of the acid formed, at a temperature comprised between —10° and +50° C., and for a time which depends on the degree of polymerization desired. With regard to the solvents, there will be employed organic liquids which are inert with respect to the reactants and which have a solvent power with regard to these latter, together with a jellifying power in respect of the polymer formed. There will preferably be used dimethyl-acetamide, dimethylformamide, N-methyl-pyrrolidone and dimethyl-sulphoxide. The reticulated polymer forms a kind of gel which is separated from the other constituents by precipitation in water.

Interfacial poly-condensation, which is carried out with the aid of an alkali compound as an acceptor of acid, has the advantage over poly-condensation in solution of being more economical, because it employs water as a reaction medium and avoids the expensive operation constitute by the recovery of the solvent and of the organic base.

The diamine will preferably be employed in the form of hydrochloride in an aqueous solution, and the acid compounds in the form of di-halogenides and trihalogenides of acids dissolved in a solvent which is inert with respect to the starting products.

As the solvent of the acid compounds, ketones are utilized such as cyclo-hexanone and cyclo-heptanone, or halogenated aliphatic or aromatic hydrocarbons such as chloroform and chlorobenzene.

As the alkali compound, there will preferably be used an alkali carbonate, and more particularly sodium carbonate in an aqueous solution, or calcium carbonate in an aqueous suspension, in a quantity just sufficient for the neutralization of the acid formed during the course of the reaction.

The reaction consists of vigorously stirring the aqueous solution of diamine hydrochloride and the organic solution of the compounds of dicarboxylic and tricarboxylic acids, and then progressively adding the solution or the suspension of alkali carbonate. The polymer separates out easily by precipitation.

The temperature of the reaction is comprised between —10° C. and +30° C., preferably between 0° and 30° C. The reaction takes place instantaneously.

In the various ways of carrying into effect the method according to the aforesaid application, the reticulated polyamide is obtained directly from diamine compounds, dicarboxylic and tricarboxylic acid compounds. The invention provides for an alternative form of the method, in which the diamine is first reacted with the compound of dicarboxylic acid, after which the compound of tricarboxylic acid is added in a subsequent stage of the method. This second stage can be carried out immediately following the first, or later.

According to this alternative form, one of the ways of carrying into effect the first stage of the method consists of poly-condensing the diamine in the molten state with the compound of dicarboxylic acid.

As compounds of carboxylic acids, there are chosen compounds from the meltable compounds, namely esters, and more particularly the phenolic and naphtholic esters of the dicarboxylic acids recited above.

Another way of carrying out the first stage of the alternative form of method according to the previous application consists of effecting an interfacial poly-condensation of the diamine with the dicarboxylic acid compound, with the aid of an alkali compound as an acid acceptor and water as the reaction medium.

The linear hydroxyl polyamide can also be obtained by poly-condensation in solution.

In this case, the di-halogenides of dicarboxylic acids, and preferably the chlorides, are employed as the acid compounds.

The product obtained in the form of a solid meltable mass, soluble in a certain number of organic solvents, can be powdered and lends itself to moulding; it is a hydroxyl polyamide having a terminal group $NH_2$ at each of the extremities of the chain and two —OH groups in each of its structural units.

The amide constitution of the polymer is clearly brought out by the absorption bands at 3420 and 1670 cm.$^{-1}$ shown by their absorption spectrum in the infrared.

The linear nature of the polymer is clearly shown by its meltability and its solubility in a certain number of organic solvents, and more particularly dimethylacetamide, dimethyl-sulphoxide and N-methyl-pyrrolidone.

One manner of carrying into effect the second stage of the alternative form of the method according to the previous application consists of reticulating the linear hydroxyl polyamide obtained during the first stage of the process. Reticulation is effected by poly-condensation in the molten state of the said linear polyamide with a compound of tricarboxylic acid.

As compounds of tricarboxylic acid, there are chosen compounds taken from the meltable compounds, namely esters, and more particularly phenolic and naphtholic esters of the tricarboxylic acids mentioned above.

The reticulation is effected, on the one hand by virtue of the terminal $NH_2$ groups of the linear polyamide, with formation of amide bonds, and on the other hand by means of the OH groups comprised in each of the structural units, with formation of ester bonds. All the OH groups do not react and the polymer obtained is a reticulated hydroxyl polyamide containing ester groups.

The mixture of linear polyamide and ester of tricarboxylic acid is heated while stirring to a temperature and for the time necessary for the completion of the reaction.

The temperature will be higher than the melting point of the esters but must not exceed 220° C. so as to avoid cyclization which could take place in certain cases. The temperature will therefore be comprised between the melting point of the esters employed and 220° C., preferably between 200° and 220° C.

The product is obtained in the form of a solid mass which can be powdered and lends itself to moulding.

This reaction during the second stage can also be carried out in a mould, in which there is introduced a mixture of linear polyamide and ester of tricarboxylic acid. The procedure is carried out at the temperatures indicated above and at pressures which may reach 1500 kg./sq. cm. It is also possible to proceed in the presence of a filler substance.

The reaction is carried out more readily when the molecular weight of the linear polyamide is lower. In consequence of its low viscosity, the linear polyamide with a low molecular weight lends itself particularly well to direct reaction inside the mould.

As already indicated above, the second stage of the alternative form of method according to the previous application can be carried out immediately following the first, or subsequently.

It is possible to add filler substances of any kind, mineral or organic to the polyamide before it is shaped. Organic fillers can play the part of plastifying agents.

As an example of the preparation of a reticulated polyamide according to the aforementioned application, the following is given:

A mixture of 44.97 grams (0.208 mol.) of dihydroxy-benzidine, 59.7 grams (0.1875 mol.) of phenolic diester of isophthalic acid and 5.97 grams (0.0136 mol.) of phenolic triester of trimesic acid is heated while stirring to 200° C. under vacuum. There is formed a molten mass which is separated from the phenol formed by distillation. The heating is stopped after 40 minutes (counting from complete melting) and the product is cooled. There is obtained a solid mass which is reduced to powder and treated several times with ethanol to eliminate the unreacted ester and the phenol. The product is then washed with dilute hydrochloric acid to eliminate all traces of dihydroxy-benzidine and is then rinsed with water until it is neutral. The yield is 94%. The polymer obtained is insoluble in all organic solvents and also in sulphuric acid, which indicates the reticulated nature of the polymer. Its polyamide structure is indicated by its infra-red spectrum (bands at 3420 cm.$^{-1}$ and 1670 cm.$^{-1}$).

These polyamides may also be manufactured by an alternative from of the above method, which consists, in the first stage, of preparing a linear polyamide of low molecular weight from a dihydroxyl diamine and a compound of dicarboxylic acid, and then in a second stage, reticulating this linear polyamide by the addition of a triester of tricarboxylic acid.

The polyamides obtained are produced in the form of a solid insoluble mass which can be reduced to powder, or in the form of shaped objects obtained either from this powder or directly during the reaction.

As reticulated hydroxyl polyamides, there will be employed all those recited in the above-identified copending application.

There will preferably be utilized the hydroxyl polyamides obtained from the following monomers:

As a diamine:
   3,3'-dihydroxy-benzidine and
   2,4-dihydroxy 3,5-diamino-benzene;
As compounds of dicarboxylic acids:
   the phenolic or naphtholic diesters; or the dichlorides of the following acids:
      isophthalic acid,
      terephthalic acid,
      sebacic acid,
      adipic acid.
As compounds of tricarboxylic acids, the triesters or the trichlorides of the following acids:
   trimesic acid,
   trimellic acid.

The duration of the cyclization reaction thus depends on the temperature. It also depends on the manner in which this temperature is obtained, on the nature of the polyamides and on the desired quality of the final product.

It should be observed that the best results were obtained by carrying out the heating gradually in steps, the duration of which can vary from 15 minutes to 2 hours. Thus for example, when it is desired to effect a complete cyclization at a temperature comprised between 350 and 400° C., it is advantageous to proceed in the following manner:

The polyamide is directly heated to a temperature comprised between 220 and 250° C., this temperature being maintained for about 1 hour, after which the temperature is brought up to a value comprised between 280 and 320° C. which is maintained for about 1 hour, and finally the temperature is brought-up to the desired value comprised between 350 and 400° C., and it is maintained at this value for the time necessary for complete cyclization of the reticulated polyamide, this time being generally comprised between 15 minutes and 1 hour.

The cyclization reaction can be carried out under a normal atmosphere. It is however preferable to work under nitrogen or under vacuum so as to avoid possible oxidation of the polyamide. The reaction is preferably carried out after putting the polyamide into the form of a shaped object, for example in a mould, if so desired in the presence of a filler.

It is obviously possible, when it is desired to prepare the starting product, namely the reticulated polyamide, oneself, to follow the preparation of this immediately by its conversion to reticulated polybenzoxazole. This method of working may be advantageous, especially when the preparation of the reticulated polyamide is effected by polycondensation in the molten state. In fact, in this case, the conversion of the reticulated polyamide to reticulated polybenzoxazole being capable of achievement in a continuous manner by continuing to heat the reticulated polyamide formed to temperatures higher than 220° C., in accordance with the method above-described.

The poly-condensation products obtained—reticulated polybenzoxazoles—are produced in the form of a coloured powder. Their infra-red spectrum brings out their constitution of polybenzoxazole by the presence of the characteristic band of benzoxazole at 1650 cm.$^{-1}$.

The reticulated nature of the polymer obtained is made evident by its total insolubility in all solvents, even in sulphuric acid, whereas the linear polybenzoxaozles are soluble in sulphuric acid.

Reticulated polybenzoxazoles are non-melting and for that reason are very stable under heat.

Their thermo-stability is still higher than that of linear polybenzoxazoles, as will appear from the accompanying drawing which is described below, and in which are shown curves of loss of weight in percent of reticulated polybenzoxazoles and linear polybenzoxazoles as a function of the temperature.

Their stability under heat, in an oxidizing atmosphere and in a humid atmosphere, is also superior to that of linear polybenzoxazoles.

Finally, they also have an excellent resistance to chemical products.

Although reticulated polybenzoxazoles are non-melting and insoluble, it is easy to produce shaped objects of reticulated polybenzoxazole by treatment of the shaped objects of reticulated polyamide.

It is also possible to form coatings of reticulated polybenzoxazole by the application on substrata of any kind (metals, mineral products, fabrics of polymer materials, etc.) of a coating of reticulated polyamide which is then converted to a coating of reticulated polybenzoxazole.

The method can be carried into effect as indicated in the examples which are given below by way of indication, without thereby constituting any limitation of the invention.

The single figure of the accompanying drawing shows, by way of example, a curve indicating the loss in weight by percentages of reticulated polybenzoxazoles and linear polybenzoxazoles as a function of the temperature.

EXAMPLE 1

68 grams of reticulated hydroxyl polyamide obtained by poly-condensation in the molten state of 44.97 grams (0.208 mol.) of 3,3'-dihydroxy-benzidine, 59.7 grams (0.1875 mol.) of phenolic diester of isophthalic acid and 597 grams (0.136 mol.) of phenolic triester of trimesic acid are heated under nitrogen to 250° C., and this temperature is then maintained for 1 hour, after which the temperature is gradually increased to 400° C., maintaining steps of 1 hour at 300° C. and half-an-hour at 400° C.

Theoretical yield: the product obtained is produced in the form of powder, insoluble in all solvents, including sulphuric acid, which shows the reticulated nature of the polymer. The absorption band of the infra-red spectrum at 1650 cm.$^{-1}$ indicates that the polymer obtained is a polybenzoxazole.

This polymer has great stability under heat, as is shown by an examination of the accompanying drawing, in which are shown curves of losses of weight in percentage (percent P) of reticulated polybenzoxazoles as a function of the temperature in ° C. (thermo-gravimetry in air 3° C./min.). The curves C and $C_1$ relate to a test in air. The curve C relates to a linear product and the curve $C_1$ to a 10% reticulated product. The curves C' and $C'_1$ are concerned with a test under nitrogen. The curve C' relates to a linear product and the curve $C'_1$ to a product with 10% reticulation.

EXAMPLE 2

30 grams of reticulated polyamide powder obtained by poly-condensation in solution of 21.6 grams (0.1 mol.) 3,3'-dihydroxy-benzidine, 16.5 grams (0.09 mol.) of dichloride of adipic acid and 1.77 grams (0.0067 mol.) of trichloride of trimesic acid are heated to 220°, which temperature is maintained for 1 hour, after which heating is gradually increased for 1 hour up to 350° C., which temperature is maintained for 1 hour.

EXAMPLE 3

68 grams of polyamide powder obtained by polycondensation of 44.97 grams (0.208 mol.) of 3,3'-dihydroxybenzidine, 59.7 grams (0.1875 mol.) of phenolic ester of terephthalic acid and 5.97 grams (0.136 mol.) of phenolic ester of trimesic acid are heated in a nitrogen atmosphere at the temperatures and for the duration indicated in Example 1. The polymer obtained is a powder insoluble in all solvents.

EXAMPLE 4

40 grams of reticulated polyamide obtained by polycondensation in a molten state of 28.0 grams (0.13 mol.) of 3,3'-dihydroxy-benzidine, 31.8 grams (0.1 mol.) of phenolic diester of isophthalic acid and 11.75 grams (0.02 mol.) of naphtholic triester of trimesic acid are heated by proceeding as described in Example 1. The polymer obtained is a powder with a high degree of reticulation.

EXAMPLE 5

The polyamide powder obtained by poly-condensation in the molten state of 37.8 grams (0.175 mol.) of 3,3'-dihydroxy-benzidine, 31.8 grams (0.1 mol.) of phenolic diester of isophthalic acid, and 21.9 grams (0.05 mol.) of phenolic triester of trimesic acid is heated by proceeding as described in Example 1. The polymer obtained is a powder with a high degree of reticulation.

EXAMPLE 6

15 grams of alumina are intimately mixed with 7 grams of reticulated hydroxyl polyamide powder obtained by poly-condensation in the molten state of 4.49 grams (0.020 mol.) of 3,3'-dihydroxy-benzidine, 5.97 grams (0.018 mol.) of phenolic diester of isophthalic acid and 0.59 gram (0.0013 mol.) of phenolic triester of trimesic acid.

This mixture is heated to 220° C. and is then placed in a mould heated to 220° C. which is maintained at this temperature for half-an-hour, after which it is compressed under a pressure of 1,000 kg./sq. cm. for 1 minute. The object formed is taken out of the mould and is then placed in an oven previously heated to 220° C. This temperature is kept at 220° C. for 1 hour, after which it is increased to 300° C. After a step of 1 hour at this temperature, the moulded object is again gradually heated up to 400° C., which temperature is maintained for 15 minutes. The product obtained ia a moulded object, composed of reticulated polybenzoxazole and an insoluble and non-meltable filler.

EXAMPLE 7

30 grams of barium sulphate are intimately mixed with 7 grams of powder of the polyamide described in Example 6 and the process is carried out as described in Example 6. The product obtained is a moulded object composed of reticulated polybenzoxazole and barium sulphate as a filler.

EXAMPLE 8

50 grams of alumina are intimately mixed with 4.497 grams (0.0208 mol.) of 3,3'-dihydroxy-benzidine, 5.97 grams (0.01875 mol.) of diester of isophthalic acid, 0.597 gram (0.00136 mol.) of triester of trimesic acid, and the mixture formed is heated to 250° C. After 30 minutes, the mass is placed in a mould heated to 250° C. and is then compressed at 1200 kg./sq. cm. for 5 minutes. The temperature of 250° C. is maintained for 1 hour, after which the heating is continued up to 300° C., this temperature being maintained for 2 hours, and then to 400° C., which temperature is maintained for 15 minutes. The polymer produced has the form of a moulded, insoluble and non-melting object.

EXAMPLE 9

There are intimately mixed together 44.97 grams (0.208 mol.) of 3,3'-dihydroxy-benzidine, 59.7 grams (0.1875 mol.) of phenolic diester of isophthalic acid, 5.97 grams (0.0136 mol.) of phenolic triester of trimesic acid, the mixture being heated to 220° C. in order to effect poly-condensation in the molten state. After 30 minutes, the molten mass is placed in a mould heated to 220° C., after which it is compressed at 500 kg./sq. cm. for 3 minutes. The temperature of 220° C. is maintained for 1 hour, after which it is increased to 280° C., which temperature is maintained for 1 hour and then increased to 350° C. for half-an-hour. The polymer obtained is produced in the form of a moulded object which is insoluble and non-meltable.

EXAMPLE 10

The reticulated polyamide powder obtained by interfacial poly-condensation of 17.5 grams (0.0605 mol.) of hydrochloride of 3,3'-dihydroxy-benzidine, 16.5 grams (0.09 mol.) of dichloride of isophthalic acid and 1.1 grams (0.00415 mol.) of trichloride of trimesic acid is heated under vacuum to 250° C. which temperature is maintained for 1 hour, after which the temperature is gradually increased to 400° C. and this temperature is maintained for another hour. The polymer obtained is non-meltable and insoluble.

What we claim is:

1. A method of manufacture of reticulated polybenzoxazoles, in which at least one reticulated hydroxyl polyamide is gradually heated to a temperature between 220° C. and 400° C. for the time necessary to obtain complete cyclization, said polyamide consisting essentially of the recurring structural formula

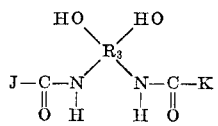

wherein $R_3$ is a tetravalent radical selected from the group consisting of

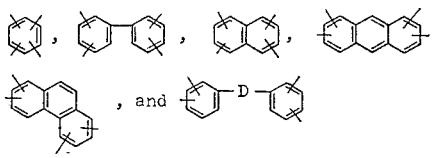

where D is selected from the group consisting of lower alkylene, oxygen, sulfur, —$SO_2$— and

and where each nitrogen atom is attached to a carbon atom of a ring of the aromatic tetravalent radical ortho or para to the carbon atom to which an —OX is directly attached; wherein J and K are either of the radicals $R_1$ or $R_2$ wherein $R_1$ is selected from the group consisting of alkylene of 1 to 10 carbon atoms,

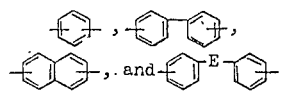

E being selected from the group consisting of alkylene of 1 to 3 carbon atoms, —O—, —S—, and —$SO_2$—, and wherein $R_2$ is selected from the group consisting of

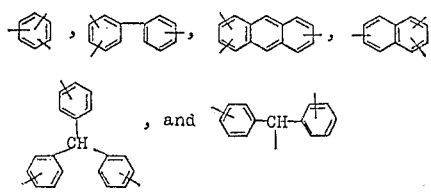

and the ratio of said trivalent radicals to said divalent radicals being between 1:20 and 1:1.

2. A method as claimed in claim 1 in which said polyamide is heated gradually to the temperature of complete cyclization through at least one intermediate step having a duration between 15 minutes and 2 hours.

3. A method as claimed in claim 1 in which said polyamide is heated directly to a temperature between 220° C. and 250° C., this temperature being maintained for a period between 15 minutes and 2 hours, the temperature being then brought-up to a first step having a value between 280° C. and 320° C., this temperature being maintained for a time between 15 minutes and 2 hours, after which the temperature is increased to a value between 350° C. and 400° C., and this temperature is maintained for a time between 15 minutes and 2 hours.

4. A method as claimed in claim 1 in which at least one reticulated hydroxyl polyamide is cyclized and is produced in the form of a molded object.

5. A method as claimed in claim 1 and comprising the cyclization of at least one reticulated hydroxyl polyamide obtained from one of the following diamines by heating gradually to a temperature between 220° C. and 400° C.
3,3'-dihydroxy-benzidine;
2,4-dihydroxy-3,4-diamino-benzene;
and one of the diphenolates, dinaphtholates or dichloride of the following dicarboxylic acids
isophthalic acid,
terephtalic acid,
sebacic acid,
and
adipic acid,
and one of the triphenolates, trinaphtholates or trichloride of the following tricarboxylic acids:
trimesic acid, and
trimellic acid 6. Reticulated polybenzoxazole of the formula

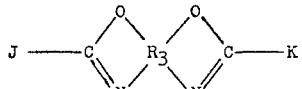

wherein $R_3$ is a tetravalent radical selected from the group consisting of

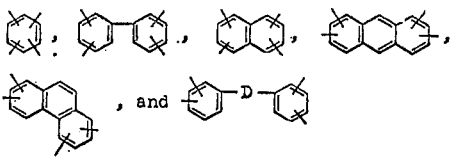

where D is selected from the group consisting of lower alkylene, oxygen, sulfur, —$SO_2$— and

and where each nitrogen atom is attached to a carbon atom of a ring of the aromatic tetravalent radical ortho or para to the carbon atom to which an —O— is directly attached; wherein J and K are either of the radicals $R_1$ or $R_2$ wherein $R_1$ is selected from the group consisting of alkylene of 1 to 10 carbon atoms,

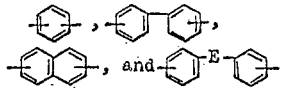

E being selected from the group consisting of alkylene of 1 to 3 carbon atoms, —O—, —S—, and —$SO_2$—, and wherein $R_2$ is selected from the group consisting of

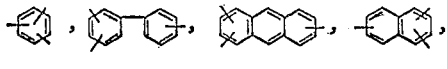
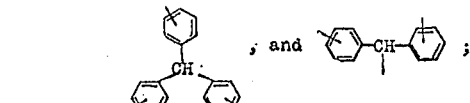

the ratio of said trivalent radicals to said divalent radicals being between 1:20 and 1:1.

References Cited

UNITED STATES PATENTS

| | | | |
|---|---|---|---|
| 3,316,213 | 4/1967 | Berr | 260—47 |
| 3,332,907 | 7/1967 | Angelo et al. | 260—47 |
| 3,376,257 | 4/1968 | Nakanishi et al. | 260—47 |

WILLIAM H. SHORT, Primary Examiner

L. L. LEE, Assistant Examiner

U.S. Cl. X.R.

260—37 N, 49, 78 TF, 78.4 R, 78.4 E; 264—331